US005937587A

United States Patent [19]
Zinbarg

[11] Patent Number: 5,937,587
[45] Date of Patent: Aug. 17, 1999

[54] GARAGE DOOR DECORATIVE COVER ASSEMBLY

[75] Inventor: Benson Zinbarg, Stamford, Conn.

[73] Assignee: Sun Hill Industries, Inc., Stamford, Conn.

[21] Appl. No.: 09/062,933

[22] Filed: Apr. 20, 1998

[51] Int. Cl.[6] .......... B62J 1/20

[52] U.S. Cl. .......... 52/3; 52/23; 52/63; 52/222; 52/311.1

[58] Field of Search .......... 52/3, 23, 63, 222, 52/311.1, 506.01

[56] References Cited

U.S. PATENT DOCUMENTS

| | | | |
|---|---|---|---|
| 222,573 | 11/1879 | Reger | 52/311.1 |
| 364,416 | 6/1887 | Hoyt | 52/311.1 |
| 775,505 | 11/1904 | Thummel | 52/23 |
| 950,746 | 3/1910 | Chamberlin . | |
| 1,103,793 | 7/1914 | Martin | 52/23 |
| 2,666,840 | 1/1954 | Poirier | 52/23 |
| 3,310,899 | 3/1967 | Hart et al. | 40/125 |
| 3,335,535 | 8/1967 | Lane | 52/23 |
| 3,614,154 | 10/1971 | Evans | 52/23 X |
| 4,335,774 | 6/1982 | Price | 160/84 R |
| 4,815,562 | 3/1989 | Denny et al. | 182/138 |
| 4,875,549 | 10/1989 | Denny et al. | 182/138 |
| 4,979,339 | 12/1990 | Jones et al. | 52/3 |
| 5,097,638 | 3/1992 | Jones | 52/2 |
| 5,240,756 | 8/1993 | Finell et al. | 428/45 |
| 5,417,273 | 5/1995 | Bamonte | 160/368.1 |
| 5,555,659 | 9/1996 | Hade | 40/604 |
| 5,579,794 | 12/1996 | Sporta | 135/88.01 |
| 5,608,992 | 3/1997 | Floyd | 52/3 |
| 5,611,382 | 3/1997 | Sferra | 160/113 |
| 5,647,157 | 7/1997 | Kasahara | 40/79.2 |
| 5,649,390 | 7/1997 | Davidson | 52/3 |
| 5,685,054 | 11/1997 | Yasnogorodskiy | 29/446 |
| 5,776,588 | 7/1998 | Wotton | 428/16 |
| 5,778,613 | 7/1998 | Thomson | 52/222 |

*Primary Examiner*—Carl D. Friedman
*Assistant Examiner*—Phi Dieu Tran A
*Attorney, Agent, or Firm*—David P. Gordon; David S. Jacobson; Thomas A. Gallagher

[57] ABSTRACT

A garage door decorative cover assembly for use on an exterior surface of a garage door made of a plurality of door panels permitted to rotate relative to each other when the garage door moves from a closed position to an open position includes at least one flexible cover panel, a fixing component, and a weighted holding mechanism. The flexible cover panel has a first end, a second end, a front surface and a back surface. The fixing component fixedly attaches the first end of the cover panel to the surface of the garage door, and the weighted holding mechanism couples the second end of the cover panel to the surface of the garage door such that the cover panel is coupled to the garage door is in both open and closed positions. The weight of the holding mechanism maintains the cover panel in a taut state whether the garage door is open or closed. The cover panel is provided with fanciful holiday, seasonal, or other celebratory indicia. According to another embodiment of the invention, the cover panel is multi-component, and the indicia on the several component panels, in side-by-side display on the garage door, together form a composite illustration.

20 Claims, 8 Drawing Sheets

GARAGE DOOR DECORATIVE COVER ASSEMBLY

BACKGROUND OF THE INVENTION

1. Field of the Invention

This invention relates broadly to flexible panels affixable to a garage door. More particularly, this invention relates to decorative flexible panels having seasonal, holiday, festive, or celebratory indicia and being easily removably affixed to a movable multi-panel garage door to provide an exterior decoration.

2. State of the Art

During certain times of the year, holiday, seasonal, and festive decorative objects are very popular. In the fall, around the time of the Halloween celebration, it is common to decorate one's home with decorative objects having a ghoulish theme, e.g., jack o'lanterns, ghosts, witches, and monsters. Following the Halloween celebration, and in the winter months, the image of Santa Claus and other Christmas themed images are everpresent in holiday displays. During the spring, with the approach of the Easter holiday, images of Easter bunnies are often included in decorative displays. In addition, when celebrating a birthday, an anniversary, or a graduation with a home-based party, it is common to decorate the home with a celebratory display.

In homes having a garage, one of the largest flat surfaces on the front of the home is the garage door surface. Therefore, the garage door surface is apparently well-suited to holding a large decorative display such as a large decorated flexible panel; that is, unless the display hinders the operation of the garage door. Operation of the garage door is important because seasonal and holiday decorations may be displayed for a relatively long period of time, such as a month.

However, permitting a garage door to be opened and closed while covered with a decorative panel is not easy. It will be appreciated that a majority of garage doors are made of hinged door panels having lateral wheels which ride in a track. Due to rotation at the hinges, when a garage door is in a partially open or open position gaps are created between the panels at the hinges and the vertical length across the exterior of all of the panels of the garage door (i.e., from the topmost door panel to the bottommost door panel) is relatively longer than when the door is in a closed position and the gaps are eliminated. Therefore, any decorative panel for a garage door must be able to remain on the exterior surface of the garage door which, in effect, changes in length as it is opened and closed.

A decorative panel having sufficient extra material such that the garage door is permitted to move from an open position to a closed position will buckle when closed, and the extra material may become caught in the closing gaps as the door closes, potentially causing the panel to tear. Moreover, a loose display will have an undesirable messy appearance. On the other hand, a tightly held decorative panel which does not permit movement of the panel relative to the exterior surface of the garage door will either prevent the garage door from fully opening, or will cause inadvertent removal of the panel from the garage door or tearing of the panel as the garage door is opened. Either scenario is undesirable.

U.S. Pat. No. 5,649,390 to Davidson describes a single panel flexible garage door cover which permits the garage door to which it is attached to open and close. The panel is draped over the front of a garage door and has upper and lower ends which extend around the upper and lower edges, respectively, of the garage door to the back of the garage door. The upper and lower ends of the panel are tethered together with elastic cords. As a result, when the garage door is opened, the elasticity of the cords permits movement of the panel relative to the garage door to allow the door to open. However, the door cover has several drawbacks. First, use of the cover requires a complicated webbing of elastic cords through eyelets in the cover and around axles of the garage door wheels, a time consuming process. Second, when the door is an open position, the web of elastic cords extends between the upper and lower ends of the cover and thereby extends into the head room of the garage.

SUMMARY OF THE INVENTION

It is therefore an object of the invention to provide a decorative garage door cover which when attached to the surface of a garage door permits the garage door to open and close without the cover becoming detached.

It is another object of the invention to provide a decorative garage door cover which is held taut and has a clean appearance on the garage door.

It is a further object of the invention to provide a decorative garage door cover which is easy to attach to a garage door.

It is an additional object of the invention to provide a decorative garage door cover which is easily removable from a garage door.

It is also an object of the invention to provide a decorative garage door cover which, upon removal, will not mar a garage door to which it is attached.

A further object of the invention is to provide a decorative garage door cover which does not deplete head room in a garage when a garage door to which it is attached is in an open position.

Another object of the invention is to provide a decorative garage door cover which is inexpensive to manufacture and can be made of light-weight materials.

An additional object of the invention is to provide a decorative garage door cover which can be printed upon by conventional printing techniques.

It is still a further object of the invention to provide a decorative garage door cover which is waterproof.

In accord with these objects, which will be discussed in detail below, a garage door cover assembly for use on a surface of a garage door is provided. The type of garage door for which the garage door cover assembly is designed typically has a plurality of door panels permitted to rotate relative to each other when the garage door moves from a closed position to an open position. The garage door cover assembly includes a flexible cover panel and at least one fixing means and at least one weighted holding means. The cover panel has a first end, a second end, a front surface, and a back surface. The front surface is preferably provided with fanciful holiday, seasonal, or other celebratory indicia. The fixing means attaches the first end of the cover panel to the surface of the garage door. The weighted holding means couples the second end of the cover panel to the surface of the garage door and includes a weight which weighs down the second end of the cover panel such that the cover panel is held taut when the garage door is in both open and closed positions.

According to a preferred first embodiment of the invention, the cover panel is provided with a hole (or other receiving means) and the weighted holding means includes a coupling means (e.g., a self-adhesive hook) coupled to the surface of the garage door and an elongate flexible member (e.g., a string) having a first end coupled to coupling means, a central portion extending through the hole, and a second end coupled to the weight. As the garage door is opened, the portion of the elongate flexible member between the coupling means and the hole is increased to compensate for the increased vertical length of the exterior surface of the garage door. When the garage door is in both the open and closed positions, the weight maintains the cover panel in a taut condition.

According to a second embodiment of the invention, the weighted holding means includes a slack elongate member coupled between the second end of the cover panel and the coupling means and a weight coupled to the second end of the cover panel. When the garage door is closed, the weight maintains the door cover in a taut condition, while the slack flexible holding member prevents the cover panel from inadvertently moving away from the garage door, e.g., by the wind. When the garage door is opened, the cover panel rides up the garage door, reducing the slack of the flexible holding member.

According to a third embodiment of the invention, the garage door decorative cover is comprised of a plurality of cover panels. Each cover panel is provided with at least one fixing means and at least one weighted holding means. Preferably the indicia on the panels, in side-by-side display on the garage door, together form a composite illustration.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
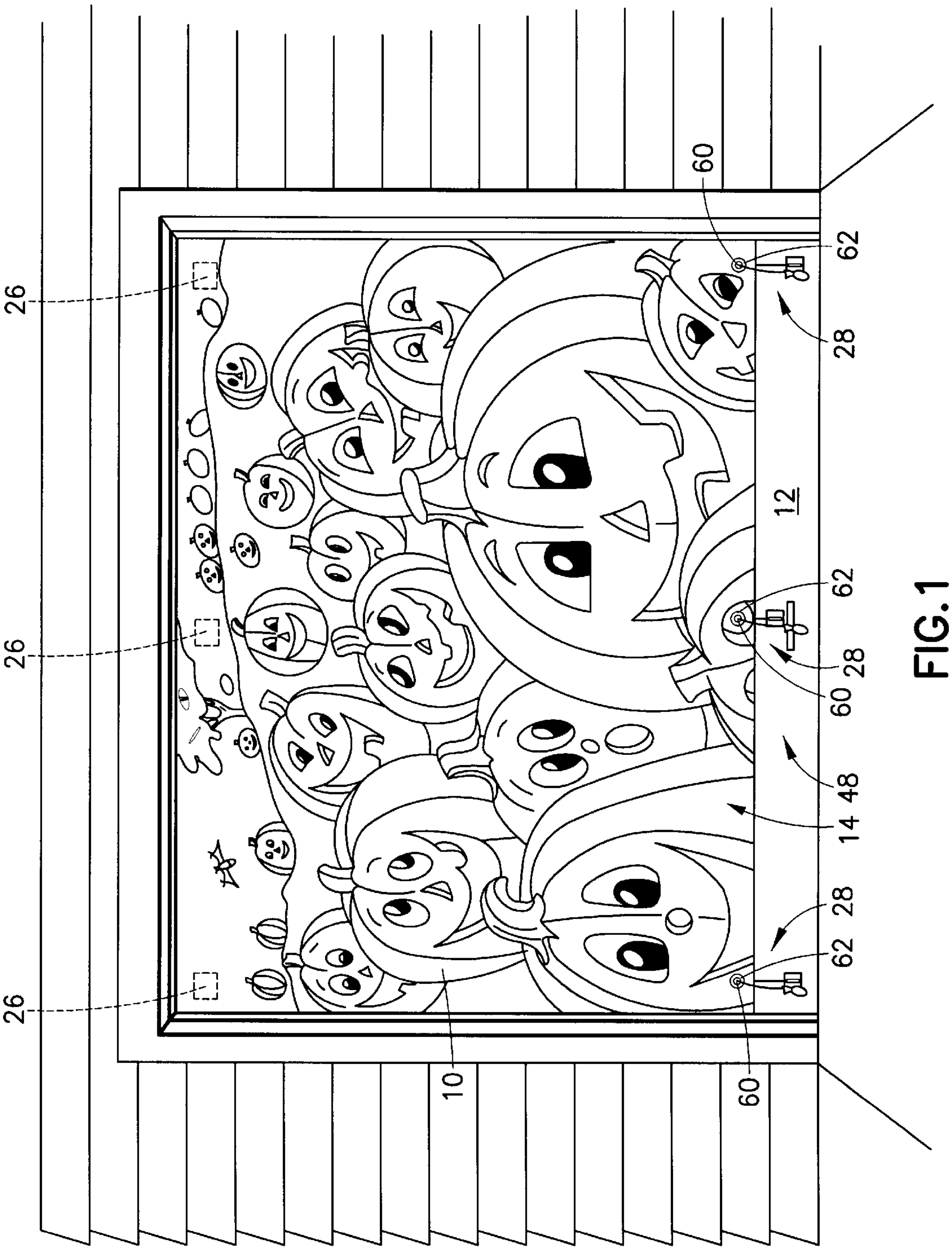
FIG. 1 is a front view of a first embodiment of a garage door cover assembly of the invention attached to a garage door which is in a closed position.

Turning now to FIG. 1, a garage door cover assembly 10 is shown attached to a garage door 12. The garage door decorative cover assembly is generally comprised of a cover panel 14 having indicia 20 provided thereon, upper fixing means 26, and lower weighted holding means 28. As described in detail below, the cover panel, which is preferably made from a flexible waterproof plastic, is coupled to the surface 30 of the garage door 12 with the upper fixing means 26 and weighted lower fixing means 28 such that the cover panel is held taut when the garage door 12 is in both open and closed positions. According to a preferred embodiment of the invention, the cover panel is made from 1–2 mil polyethylene, approximately 60–72 inches in height by 90 inches in width. Preferably, the indicia on the cover panel 14 is of a fanciful holiday, seasonal, or other celebratory nature.

Figure 3:
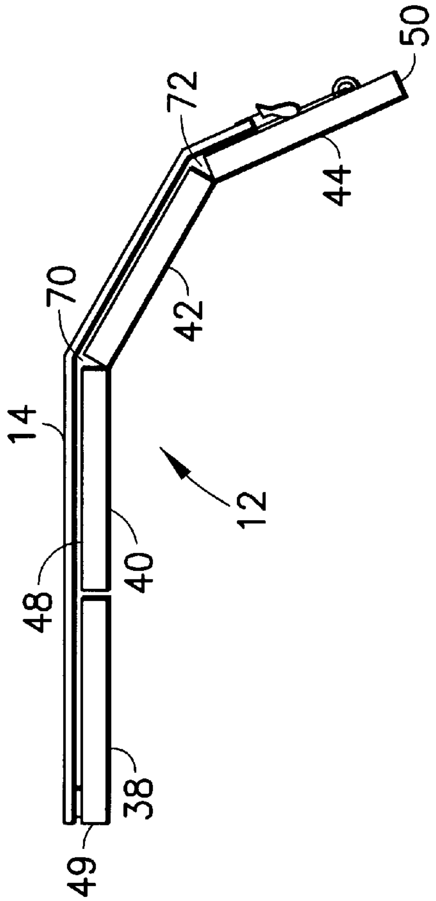
FIG. 3 is a side view of the first embodiment of a garage door decorative cover of the invention attached to a garage door which is in an open position.
Figure 2:
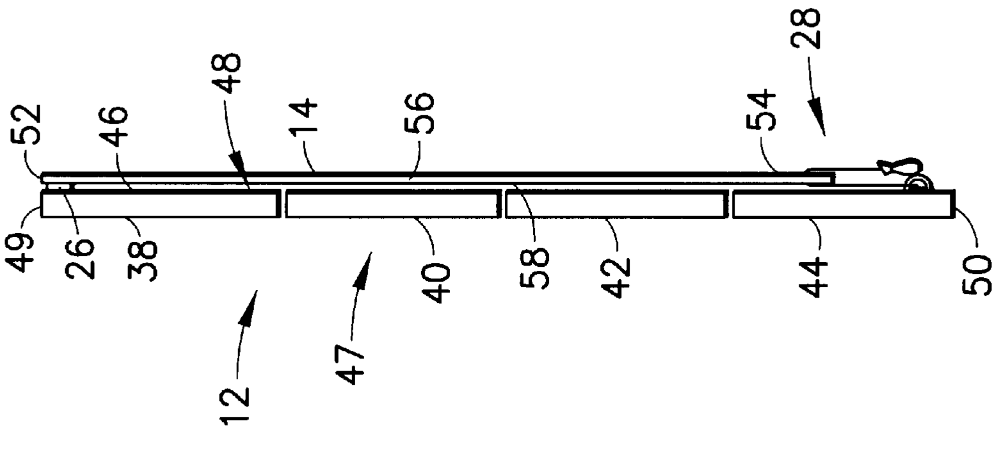
FIG. 2 is a side view of the first embodiment of a garage door decorative cover assembly of the invention attached to a garage door which is in a closed position.

Referring to FIGS. 2 and 3, the garage door decorative cover assembly 10 is adapted for attachment to a multi-panel garage door. It will be appreciated that multi-panel garage doors are generally made from a plurality of door panels, e.g., four door panels 38, 40, 42, 44 which are permitted to rotate relative to each other when the garage door moves from a closed position (FIG. 2) to an open position (FIG. 3). The surface 30 of the garage door is defined by an interior surface 47 facing the inside of the garage, an exterior surface 48, an upper edge 49 on the top surface of the topmost door panel 38, and a lower edge 50 on the lower surface of the lowermost door panel 44.

Referring to FIG. 2, the cover panel 14 has a top portion 52, a bottom portion 54, a front surface 56, and a back surface 58. Each upper fixing means 26 (and a plurality of spaced-apart upper fixing means are preferably used) is preferably a piece of removable, non-marring, double-sided foam tape, such as Magic Removable Mounts™ sold by Miller Studios of New Philadelphia, Ohio, although other adhesives may be used. With respect to each piece 26 of double-sided tape, one side of the tape is adhered to the exterior surface 46 of the garage door at the topmost door panel 38. The back surface 58 of the top portion 52 of the cover panel 14 is adhered to the other side of the upper fixing means 26.

Figure 4:
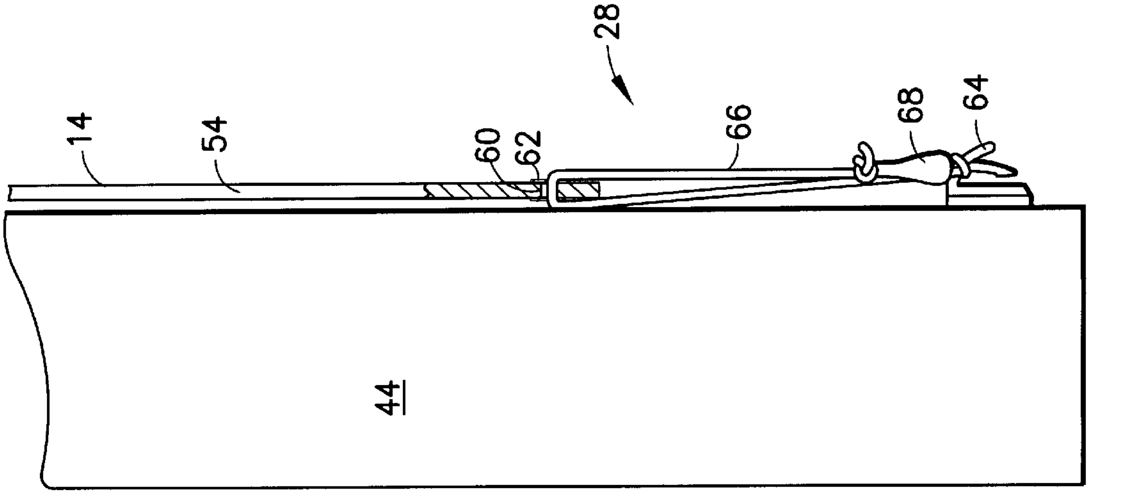
FIG. 4 is a broken enlarged side view of the first embodiment of a garage door cover of the invention attached to a garage door which is in a closed position.

Referring to FIGS. 1 and 4, and according to a preferred embodiment of the invention, the lower bottom portion 54 of the cover panel 14 is provided with one or more holes 60. Reinforcement rings 62 (e.g., plastic low friction washers) are preferably adhered or otherwise coupled about the holes and strengthen the cover panel 14 (and prevent tearing) in the area surrounding the holes 60. The weighted lower holding means 28 (a plurality of weighted lower holding means may be used) includes a garage door coupling means 64, a flexible elongate member 66, and a weight 68. The coupling means 64 is preferably a self-adhesive hook (shown in FIG. 4) or loop having a non-marring adhesive. The flexible elongate member 66 is preferably string, cord, twine, or nylon line. The weight 68 is preferably a small lead fishing weight (as shown in FIG. 4), a small bag of material such as dirt or sand, or another appropriate weight. The total weight of all the weights of all the weighted holding means is preferably between three ounces and five pounds. The coupling means 64 is attached to the exterior surface 48 of the garage door 14, and the elongate member 66 is tied to the coupling means 64 and thread through one of the holes 60. The elongate member 66 is then tied to the weight 68. The assembly is repeated for each weighted holding means 28 coupled to the cover panel 14. When the garage door 12 is in a closed position and the weight(s) 68 are freely hung from the elongate member 66, the cover panel 14 is held taut.

Figure 6:
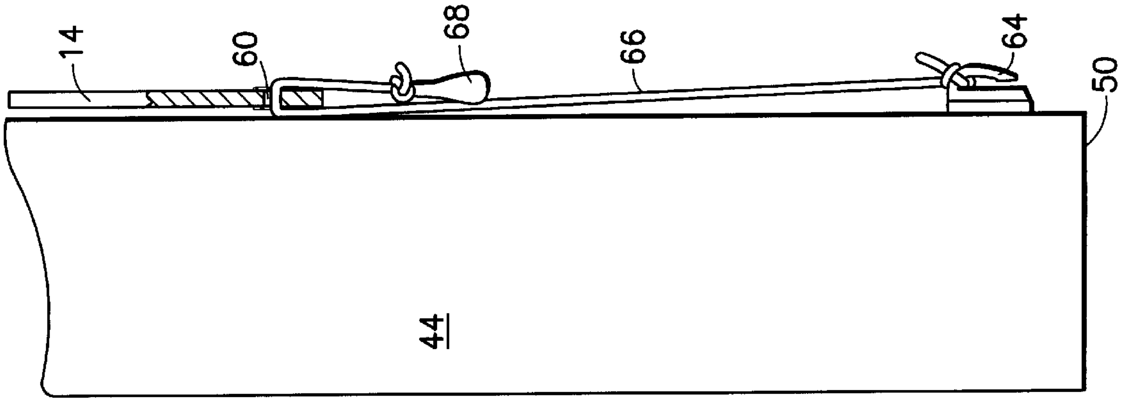
FIG. 6 is a broken enlarged side view of the first embodiment of a garage door cover of the invention attached to a garage door in an open position.
Figure 5:
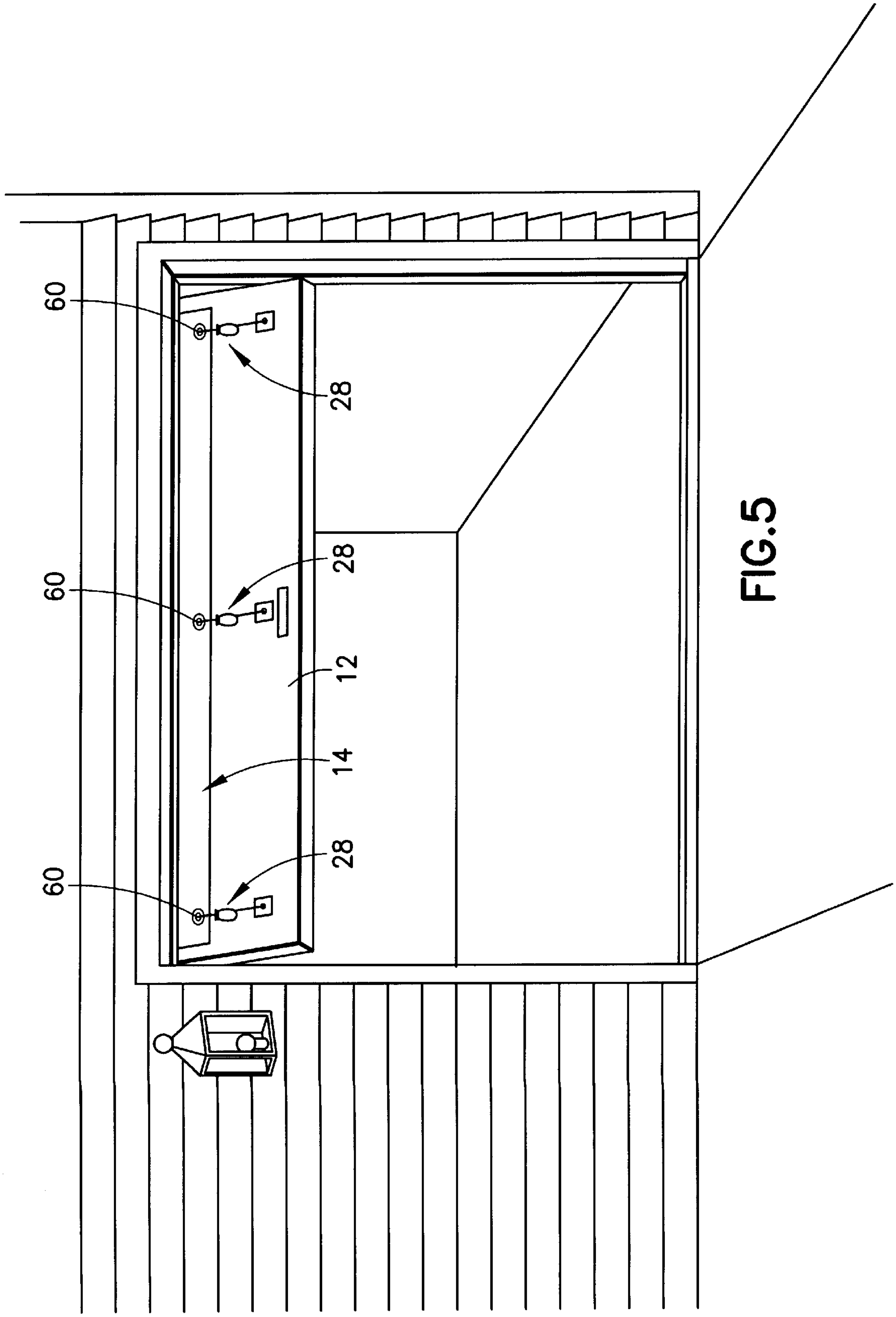
FIG. 5 is a perspective view of a lower portion of the first embodiment of a garage door decorative cover of the invention attached to a garage door which is in an open position.

Turning back to FIG. 3, as the garage door 12 is opened, the plurality of door panels rotate relative to each other; for example, the door panels may be oriented such that one or more door panels 38, 40 are relatively horizontal, and others of the door panels 42, 44 are oriented at some intermediate angle between vertical and horizontal. The relative rotation of the door panels 38, 40, 42, 44 creates gaps 70, 72 (FIG. 3) between the door panels which, in effect, increase the distance along the exterior surface 48 between the top edge 49 of the topmost door panel 38 and the bottom edge 50 of the bottommost door panel 44 relative to the distance along the exterior surface between the same points when the door is closed and all the door panels are relatively vertical. Referring to FIGS. 3, 5 and 6, as the distance between those points increases, the cover panel 14, fixed to topmost door panel 38, rides up the exterior surface 48 of the garage door 12 causing the length of each flexible elongate member 66 between the coupling means 64 and a hole 60 in the cover panel 14 through which it is thread to increase. Consequently, the length of the elongate members 66 between the holes 60 and the weights 68 decrease and raise the weights relative to the bottom edge 50 of the garage door. Moreover, as the garage door 12 is moved from an open position back to a closed position, the taut cover panel 14 is prevented from being caught in closing gaps 70, 72 (FIG. 3). The cover panel 14 is thereby able to accommodate the opening and closing of the garage door while always maintaining the cover panel in a taut condition. An easy-to-assemble and inexpensive-to-manufacture garage door decorative cover assembly is thereby provided.

Figure 8:
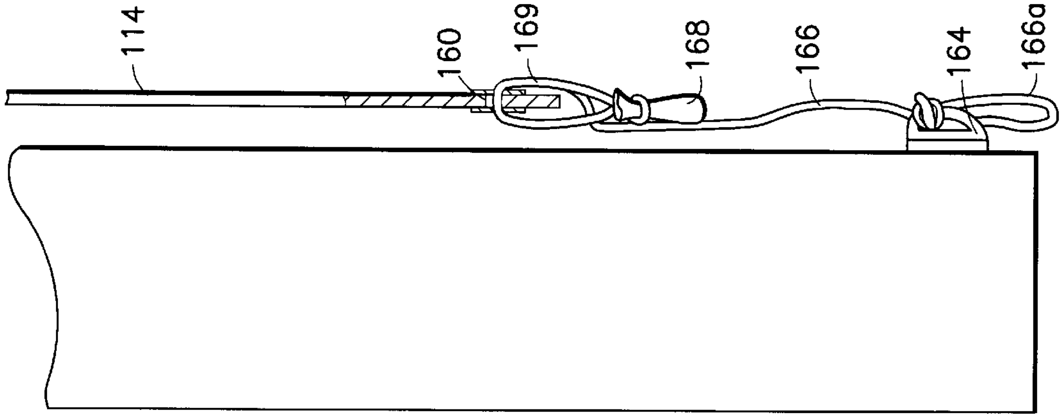
FIG. 8 is a broken enlarged side view of the garage door cover in FIG. 7.
Figure 7:
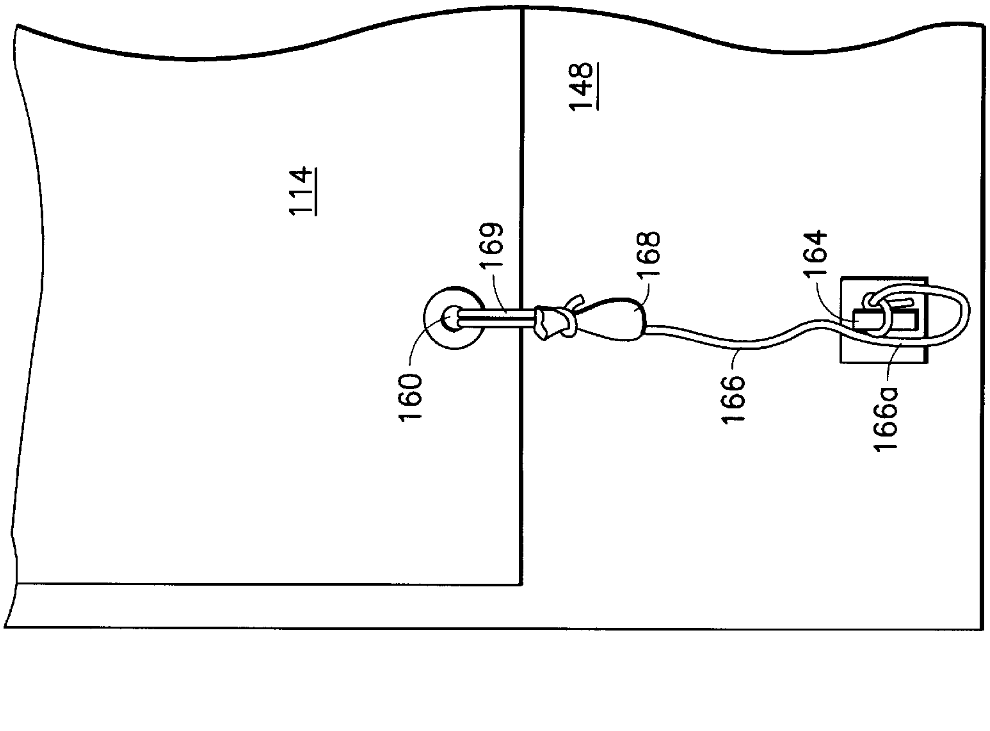
FIG. 7 is a broken enlarged front view of a second embodiment of the garage door cover of the invention to a garage door in a closed position.

Turning now to FIGS. 7 and 8 and according to a second embodiment of the garage door cover assembly of the invention, the second weighted fixing means 128 includes a coupling means 164, such as a self-adhesive loop, a first flexible elongate member 166 tied to both the hole 160 in the cover panel 114 and to the coupling means 164, a weight 168, and a second elongate member 169 tied to both the weight 168 and the hole 160. The weight 168, as shown, may be a small bag filled with a relatively heavy material. The first elongate member 166 is of sufficient length to be slack when the garage door is in a closed position and to have reduced slack or be slightly taut when the garage door is an open position.

Figure 10:
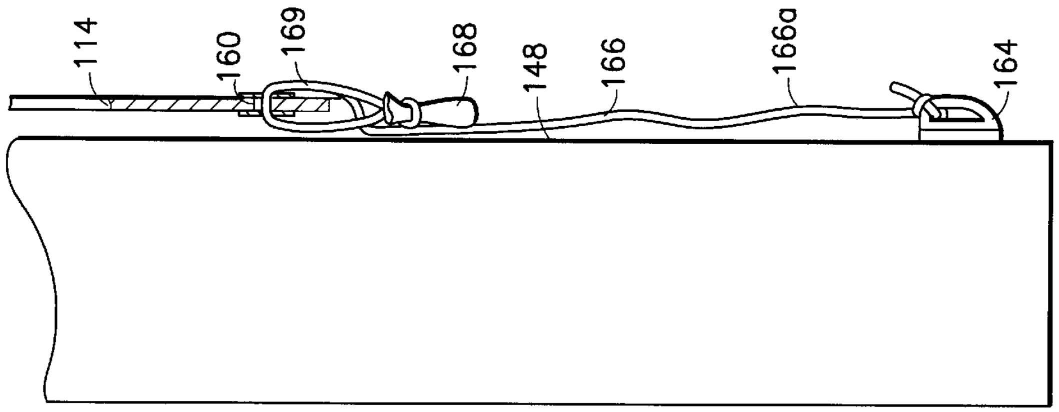
FIG. 10 is a broken enlarged side view of the garage door cover in FIG. 9.
Figure 9:
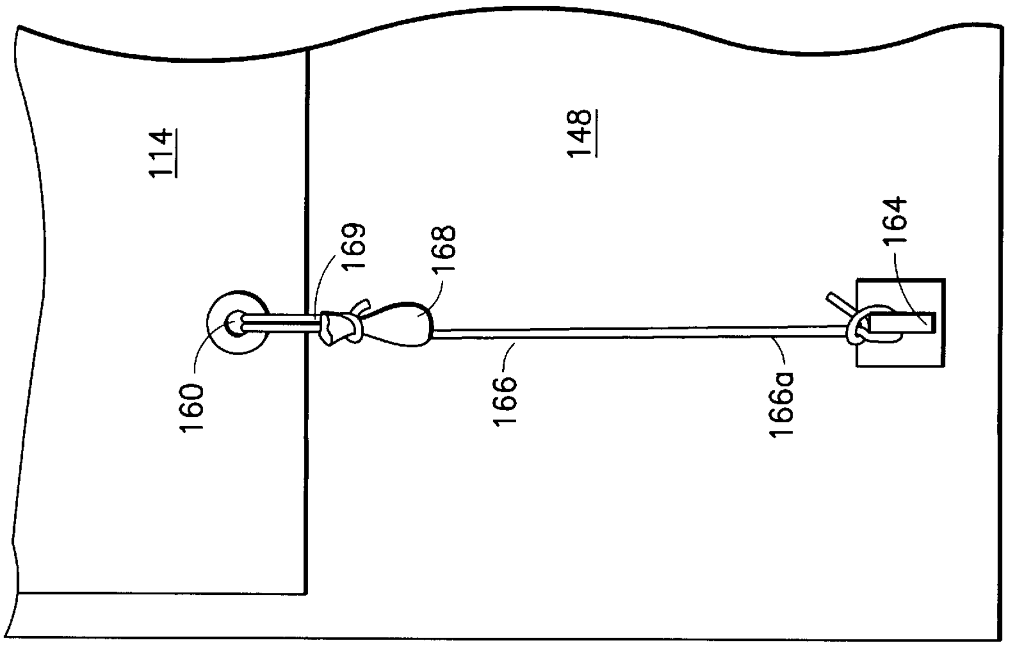
FIG. 9 is a broken enlarged front view of a second embodiment of the garage door cover of the invention to a garage door in an open position.

As such, referring to FIGS. 9 and 10, when the garage door is opened, the cover panel 114 rides up the exterior surface 148 of the garage door, extending the previously slack portion **166*a* of the first flexible elongate member (compare FIGS. 8 and 10). The weight 168 causes the cover panel 114 to remain taut whether the garage door is in open or closed positions and regardless of the amount of slack in the first elongate member 166. The first flexible elongate member 166** prevents the cover panel from inadvertently being moved away from the exterior surface of the garage door, e.g., as a result of a strong gust of wind. To prevent exaggerated windblown movement of the cover panel, the first flexible elongate member is preferably provided with only enough slack to permit the garage door to open and close without causing the removal of the cover panel from the garage door surface.

Figure 11:
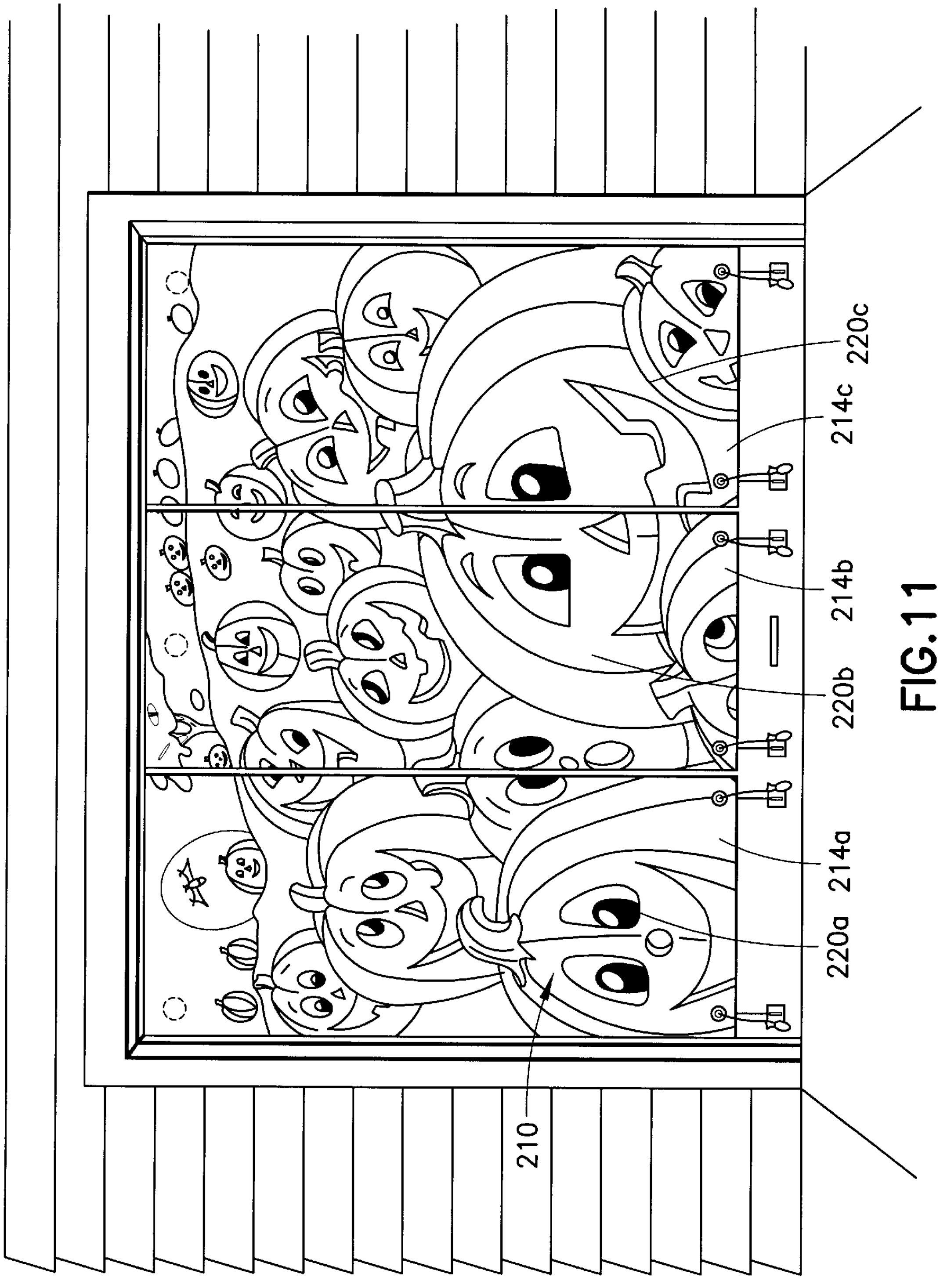
FIG. 11 is a front view of a third embodiment of a garage door cover assembly of the invention attached to a garage door which is in a closed position.

Turning now to FIG. 11, a third embodiment of a garage door decorative cover assembly 210 of the invention is shown. The garage door cover assembly is substantially similar to the first embodiment, with the difference being that the cover panel is comprised of a plurality of smaller component panels **214*a*, 214*b*, 214*c*. Each panel is preferably provided with indicia 220*a*, 220*b*, 220*c*** and together form a composite illustration. The fixing means and weighted holding means for the component panels may be of any of the previously or subsequently described fixing means and weighted holding means, respectively.

Figure 13:
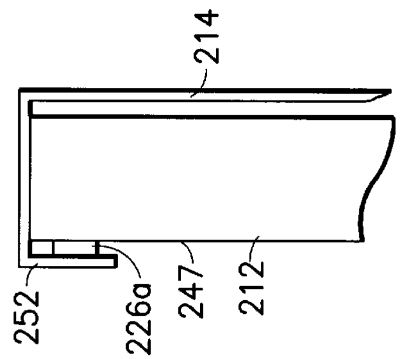
FIGS. 12 and 13 illustrate additional embodiments of a fixing means for attaching a cover panel to a garage door.
Figure 12:
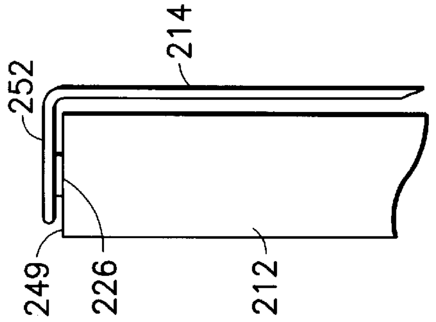

In the previous embodiments, the fixing means has been described as being coupled to the exterior surface of the garage door. Referring now to FIG. 12, it will be appreciated that the fixing means 226 and the top portion 252 of the cover panel 214 may alternatively be coupled to the top surface 249 of the garage door 212. As another alternative, referring to FIG. 13, the fixing means **226*a* may couple the top portion 252 of the cover panel 214 to the interior surface 247 of the garage door 212**.

Figure 16:
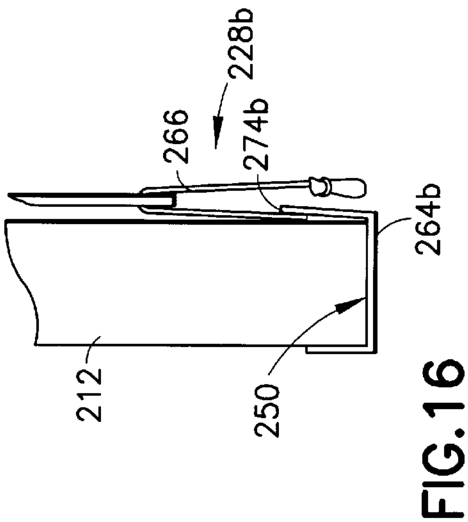
FIGS. 14 through 16 illustrate additional embodiments of a weighted holding means for attaching a cover panel to a garage door.
Figure 15:
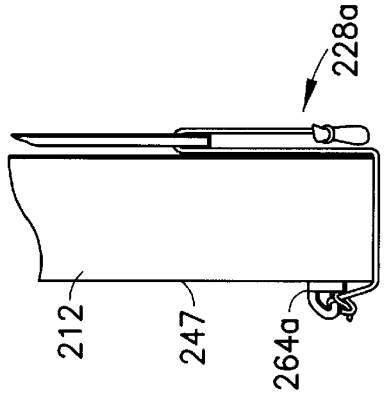
Figure 14:
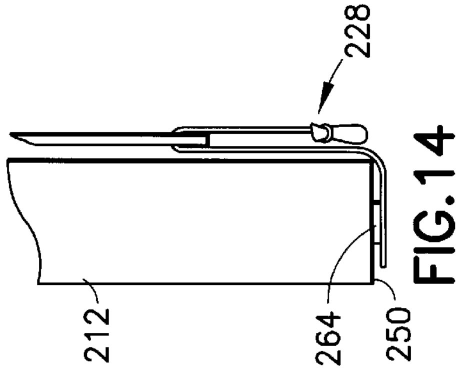

Moreover, with respect to the previous embodiments, the holding means has included a coupling means that has been described as being coupled to the exterior surface of the garage door. Referring now to FIG. 14, the coupling means 264 of the weighted holding means 228 may also be coupled to the bottom surface 250 of the garage door 212. Where the coupling means is coupled at the bottom surface 250, the coupling means is preferably relatively flat (so as not to obstruct the garage door from flushly closing) and may be a piece of adhesive to which an elongate flexible member will sufficiently adhere. Alternatively, referring to FIG. 15, the coupling means **264*a* of the holding means 228*a* can be coupled to the interior surface 247 of the garage door 212. In addition, referring to FIG. 16, the coupling means 264*b* of the holding means 228*b* may also be a hook or other structure which fits around the bottom surface 250 of the garage door 212 and which includes an attachment portion 274*b* to which an elongate flexible member 266** can be attached, e.g., by tying.

There have been described and illustrated herein several embodiments of a garage door decorative cover. While particular embodiments of the invention has been described, it is not intended that the invention be limited thereto, as it is intended that the invention be as broad in scope as the art will allow and that the specification be read likewise. Thus, while in one embodiment the decorative cover is shown as comprising three flexible cover panels, for ease of manufacture and especially for ease of printing indicia thereon, it will be appreciated that the decorative cover may be made from two or more than three panels as well. Furthermore while particular types of materials have been disclosed, it will be understood that other materials can be used as well. For example, and not by way of limitation, while polyethylene plastic is disclosed as a preferred material for the cover panels, polypropylene, polyvinylchloride, paper, fabric, and other materials can also be used. Also, while the coupling means has been disclosed as being an adhesive, a hook, or a loop, it will be appreciated that other coupling means can likewise be used. For example, staples, tacks, nails, etc., may each be used as coupling means. Moreover, while in each embodiment, the weighted holding means is shown to include a coupling means to couple a lower end of the cover panel to the garage door, it will be appreciated that the lower end need not be coupled to the garage door and that the weight may simply hold the lower end of the cover panel against the garage door. In addition, while the cover panel has been described as having at least one hole provided therein for receiving the elongate flexible member, it will be appreciated that the cover panel need not have one or more holes and that other receiving means for receiving the elongate flexible member can be used. For example, clip members, hook members, loop members, etc., couplable to the cover panel and having an attachment portion for receiving the flexible member can also be used. Moreover, a weight does not need to be hung from the cover panel, as the weight can be directly attached to the cover panel, e.g., a ballast can be attached to the lower portion of the cover panel. It will therefore be appreciated by those skilled in the art that yet other modifications could be made to the provided invention without deviating from its spirit and scope as so claimed.

What is claimed is:

1. A garage door cover assembly, comprising:

a) a garage door having a plurality of door panels which are permitted to rotate relative to each other when said garage door moves from a closed position to an open position, said garage door having a garage door surface;

b) a flexible cover panel having a first end, a second end, a front surface and a back surface;

c) a fixing means for attaching said first end of said cover panel directly to said garage door surface; and d) a holding means for holding said second end of said cover panel against said garage door surface, said holding means comprising a weight member which pulls said second end of said cover panel taut relative to said first end of said cover panel when said garage door is in both said open position and said closed position.

2. A garage door cover assembly according to claim 1, wherein:

said fixing means removably fixedly attaches said first end of said cover panel to said garage door surface.

3. A garage door cover assembly according to claim 2, wherein:

said fixing means is non-marring to said garage door surface when said fixing means is removed from said garage door surface.

4. A garage door cover assembly according to claim 1, wherein:

said holding means further comprises an elongate flexible member and a coupling means, wherein said coupling means is coupled to said garage door surface and said flexible member extends between said coupling means and said weight member.

5. A garage door cover assembly according to claim 4, wherein:

said cover panel is provided with means for receiving said elongate flexible member.

6. A garage door cover assembly according to claim 5, wherein:

said means for receiving said elongate flexible member is a hole provided in said cover panel.

7. A garage door cover assembly according to claim 6, further comprising:

d) low friction reinforcement means surrounding said hole for strengthening said cover panel adjacent said hole.

8. A garage door cover assembly according to claim 4, wherein:

said coupling means is one of a hook and loop adhered to said garage door surface.

9. A garage door cover assembly according to claim 4, wherein:

said coupling means is a hook mechanically couplable to said garage door.

10. A garage door cover assembly according to claim 4, wherein:

said weight member comprises a container at least partially filled with a material.

11. A garage door cover assembly according to claim 1, wherein:

said holding means is a plurality of holding means.

12. A garage door cover assembly according to claim 10, wherein:

said second end of said cover panel is provided with a plurality of holes, at least one of said plurality of holes for each of said plurality of holding means.

13. A garage door cover assembly according to claim 12, further comprising:

d) low friction reinforcement means surrounding each of said plurality of holes for strengthening said cover panel adjacent said plurality of holes.

14. A garage door cover assembly according to claim 1, wherein:

said front surface of said cover panel is provided with indicia.

15. A garage door cover assembly according to claim 14, wherein:

said indicia is one of fanciful holiday indicia, fanciful seasonal indicia, and fanciful celebratory indicia.

16. A garage door cover assembly according to claim 1, wherein:

said cover panel is made from waterproof plastic.

17. A garage door cover assembly, comprising:

a) a garage door having a plurality of door panels which are permitted to rotate relative to each other when said garage door moves from a closed position to an open position, said garage door having a garage door surface;

b) a plurality of flexible cover panels, each having a first end, a second end, and a front surface;

c) for each of said plurality of cover panels, a fixing means for attaching said first end of one of said cover panels directly to said garage door surface;

d) for each of said plurality of cover panels, a holding means for coupling said second end to said garage door surface, said holding means comprising a weight member which pulls said second end of said respective cover panel taut relative to said first end of said respective cover panel when said garage door is in both said open position and said closed position; and e) indicia provided on said front surface of each of said plurality of cover panels.

18. A garage door cover assembly according to claim 17, wherein:

when said plurality of cover panels are positioned side-by-side on said garage door surface, said indicia form a composite illustration.

19. A garage door cover assembly according to claim 17, wherein:

each said holding means further comprises an elongate flexible member and a coupling means for coupling said elongate flexible member to the garage door surface, wherein said flexible member extends between said coupling means and said weight.

20. A garage door cover assembly, comprising:

a) a garage door having a plurality of door panels which are permitted to rotate relative to each other when said garage door moves from a closed position to an open position, said garage door having a garage door surface;

b) a flexible cover panel having a first end, a second end, a front surface and a back surface;

c) a first non-resilient means for attaching said first end of said cover panel to said garage door surface;

d) a second non-resilient means for holding said second end against said garage door surface, said second non-resilient means comprising an elongate flexible member which is slack to a first degree when said garage door is in said closed position, and one of slack to a second degree less than said first degree and taut when said garage door is in said open position; and e) a weighting member which pulls said second end of said cover panel taut relative to said first end of said cover panel when said garage door is in both said open position and said closed position.

* * * * *